United States Patent [19]

Tervamäki

[11] 4,283,950

[45] Aug. 18, 1981

[54] DEVICE FOR DETACHING AND REMOVING A DISPOSABLE TIP OF A PIPETTE

[75] Inventor: Jukka Tervamäki, Helsinki, Finland

[73] Assignee: Kommandiittiyhtio Finnpipette Osmo A. Suovaniemi, Finland

[21] Appl. No.: 60,042

[22] Filed: Jul. 24, 1979

[30] Foreign Application Priority Data

Aug. 4, 1978 [FI] Finland .................................. 782401

[51] Int. Cl.[3] .......................... B01L 3/02; G01N 1/14

[52] U.S. Cl. .................................. 73/864.14; 422/100

[58] Field of Search ................... 422/100; 73/425.4 P, 73/425.6

[56] References Cited

U.S. PATENT DOCUMENTS

| | | | |
|---|---|---|---|
| 3,494,201 | 2/1970 | Roach | 422/100 X |
| 3,991,617 | 11/1976 | d'Autry | 73/425.4 P |
| 4,096,751 | 6/1978 | Witners et al. | 73/425.6 |
| 4,141,250 | 2/1979 | d'Autry | 73/425.6 |
| 4,151,750 | 5/1979 | Suovaniemi et al. | 73/425.6 |

*Primary Examiner*—Barry Richman

*Attorney, Agent, or Firm*—Hopgood, Calimafde, Kalil, Blaustein & Judlowe

[57] ABSTRACT

A device for detaching and removing the detachable mouth-piece or disposable tip of a pipette, said pipette comprising a handle portion, in whose interior or at whose bottom end are attached a cylinder portion with tip tube, a piston fitted into the cylinder portion, which piston can be pressed down against a spring force by means of a press button and a piston rod, said spring being arranged so that it restores the piston to the upper position, and that a sleeve-shaped pusher or similar pushing means operated by an inertia means is fitted around the tip tube of the pipette, which pusher can move in the longitudinal direction of the tip tube of the pipette.

7 Claims, 4 Drawing Figures

DEVICE FOR DETACHING AND REMOVING A DISPOSABLE TIP OF A PIPETTE

The subject of the invention is a device by means of which it is possible to detach and remove the detachable mouth-piece, a so-called disposable tip, of a pipette hygienically, untouched by hand. It is a previously known procedure to provide the tubular lower end of pipettes with a removable tip, which is usually made conical in order to provide good fastening. By means of detachability and removability of the mouth-piece, the risk of contamination of the pipette itself is avoided, as the liquid is sucked only into the mouth-piece, which can be replaced by a new one if the next sample requires that.

Since pipettes are frequently used for the dosage of highly active chemical and bilogical samples and reagents, it is quite desirable that the detaching and removal of the tip should not have to be performed by touching the tip by hand.

Several methods and devices are previously known for the removal of the tip untouched by hand. E.g., the waste box into which the discarded tips are removed may be provided with a U-shaped notch, against which the pipette can be pulled so that the tip is detached and falls into the box. Devices are also known which, mounted on the pipette itself, function as tip removers when the operation button of the device concerned is pulled, turned or pushed either by one hand or by two hands. Said tip-removing devices are, however, often of quite a complicated construction and consist of several components and they require considerable additions and expensive constructional details in the pipette itself right at the manufacturing stage.

The object of the present invention is to provide a tip removing device of a simple construction and eliminating the drawbacks encountered earlier in corresponding devices.

The device in accordance with the invention is mainly characterized in that a sufficiently heavy weight-piece is fastened to the tip-removing sleeve or the tip-removing sleeve itself constitutes a sufficiently heavy weight-piece or a sufficiently heavy weight-piece has been positioned as separate from the tip-removing sleeve as acting upon said sleeve, so that when the pipette is swayed in the direction of its longitudinal axis towards the tip of the tip vessel by means of a rapid movement, acceleration of the weight-piece can be achieved so that, at the end of its swaying movement, the weight-piece is, by the effect of the momentum of inertia of its weight, shifted downwards in relation to the pipette body and to the tip tube thereby producing an impact of the tip-removing sleeve against the top edge of the tip vessel, either directly, by way of impact, or by the intermediate of a transmission mechanism, such as a lever mechanism, whereby the tip vessel flies off from the friction joint at the bottom end of the tip tube.

Figure 1:
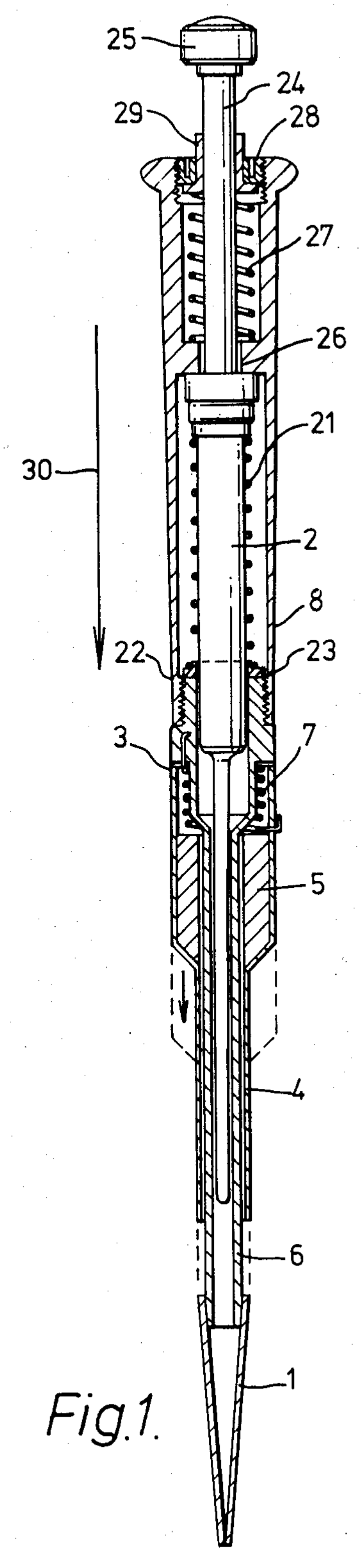
Figure 2:
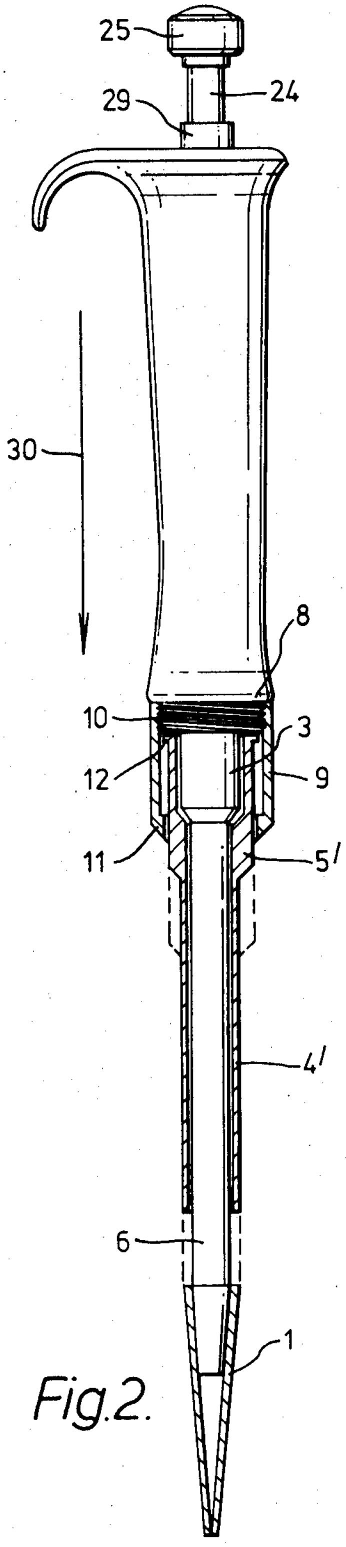
Figure 3:
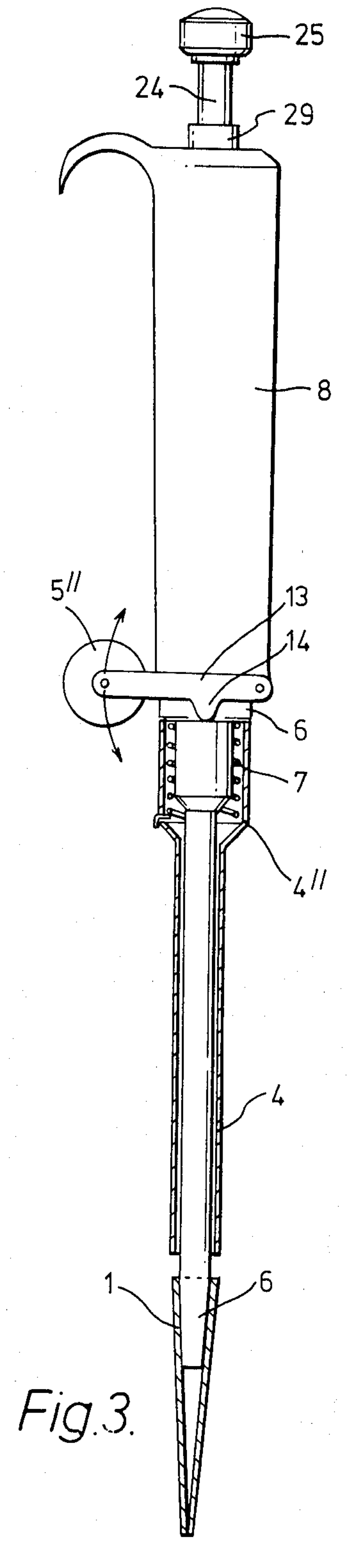
Figure 4:
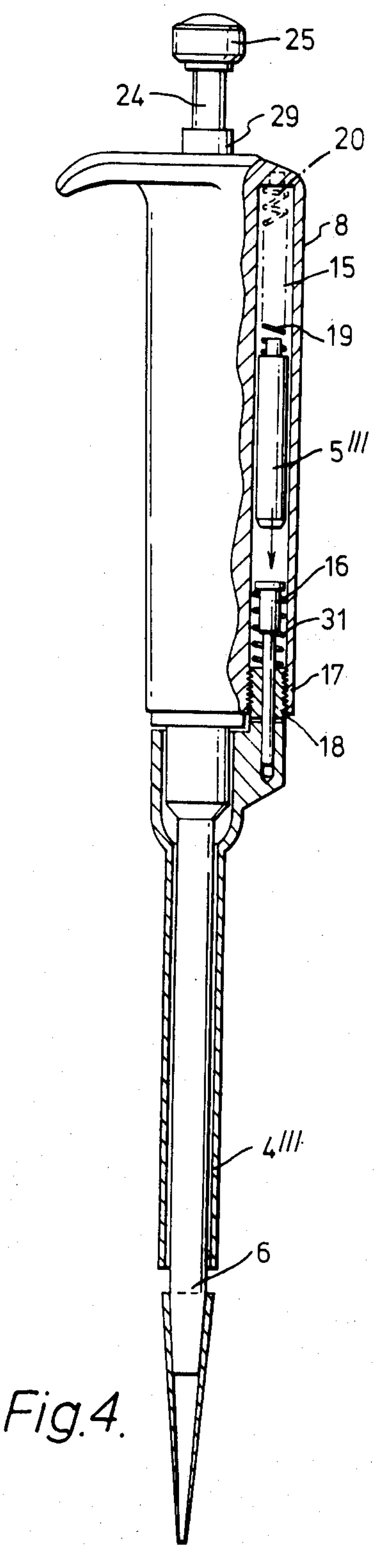

The invention comes out more closely from the following description and from the attached drawings, wherein FIG. 1 shows a pipette in accordance with the present invention as a side view in section, FIG. 2 shows another embodiment of a pipette in accordance with the present invention as a side view and partly in section, FIG. 3 shows a third embodiment of a pipette in accordance with the present invention as a side view and partly in section, and FIG. 4 shows a fourth embodiment of a pipette in accordance with the present invention as a side view and partly in section.

FIG. 1 shows a pipette which comprises a body 8 constituting a handle portion and to whose bottom end a cylinder portion 3 with the tip tube 6 is attached by means of a threaded joint. A disposable tip vessel 1 is attached to the bottom end of the tip tube 6, into which tip vessel the liquid to be pipetted is supposed to be sucked. A piston 2 is fitted into the cylinder portion 3, and a coil spring 21 is fitted around the piston 2 and presses the piston 2 upwards. At the top end of the cylinder portion 3 there is a ring groove, into which a seal ring 22 is fitted around the piston 2. The seal ring 22 is closed into the groove by a ring disk 23 pressed downwards by the spring 21. A piston rod 24 is fitted so as to act upon the upper end of the piston 2, the upper end of said rod being provided with a press button 25. Inside the body 8 of the pipette there is an annular shoulder 26 against which a secondary spring 27 fitted around the piston rod 24 rests. A slide bushing 29 is fitted into the upper part of the pipette body 8 by means of a calibration nut 28, and the upper end of the secondary spring 27 rests against the bottom face of said slide bushing.

In FIG. 1, a tip-removing sleeve 4 is fitted around the tip tube 6 of the pipette, which sleeve is pulled into the upper position by a spring 7. The upper end of the drawing spring 7 is fastened to the body components of the pipette and the lower end to the tip-removing sleeve 4. Inside the tip-removing sleeve 4, a weight-piece 5 is fitted in the way coming out from FIG. 1, said weight-piece being preferably of a metal. The tip-removing sleeve 4 can move against the spring force of the drawing spring 7 downwards in the longitudinal direction of the tip tube 6. A certain distance, preferably about 2 to 25 mm, remains between the lower end of the tip-removing sleeve 4 and the upper edge of the detachable tip vessel 1.

When pipetting is performed, the knob 25 is pressed, whereby, together with the knob, the piston rod 24 and the piston 2 move down until the knob 25 is pressed against the secondary support 29. From here the knob and the piston can be pressed down further the length of the secondary support 29 projecting from the upper end of the body 8. An upper stop of the movement of the piston 2 consists of an annular projection 26 inside the body 8, against which projection a plate-shaped expansion at the lower part of the piston rod 24 is pressed when the piston 2 returns to its upper position.

According to the invention, the disposable tip vessel 1 of the pipette is detached so that the pipette is swayed in its longitudinal direction with an appropriately rapid or sharp movement in the direction of the arrow 30, whereby the tip-removing sleeve 4, by the effect of the heavy weight 5 placed therein, continues its movement downwards after the swaying movement on the tubular tip tube 6 of the pipette, and the lower edge of the tip-removing sleeve 4 hits against the upper edge of the disposable tip vessel 1, whereby the tip vessel 1 becomes detached from its friction joint and flies away in the direction of the arrow 30 to the desired destination, e.g. waste box. After the swaying and tip-vessel-detaching movements the spring 7 restores the tip-removing sleeve 4 to the upper position.

It is an essential feature of the operation of the tip-removing device in accordance with the present invention that the removal of the tip vessel 1 is performed by making use of the momentum of inertia of a mobile weight 5. In the example case depicted in FIG. 1, the spring 7 of the tip-removing sleeve 4 is a drawing spring, but the arrangement of the sleeve 4 may, of course, be designed correspondingly by means of a compression spring, with minor changes in construction. Also, instead of one spring 7, it is possible to use several parallel springs. Moreover, it is possible to manufacture the tip-removing sleeve 4 of such a material, e.g. metal, that the weight-piece 5 is already included in the material of the tip-removing sleeve 4.

FIG. 2 shows an embodiment alternative to the constructional embodiment of FIG. 1. In this embodiment the weight 5' and the tip-removing sleeve 4' are made of one piece moving on the tubular lower portion 6 of the pipette. A locking sleeve 9 is fitted around the upper part of the tip-removing sleeve 4', which locking sleeve is by means of threading 10 fastened to the cylinder part 3 of the pipette. At the lower edge of the locking sleeve 9, inside, there is an annular shoulder 11, and, correspondingly, at the upper edge of the tip-removing sleeve 4' there is an annular shoulder 12 projecting outwards. The annular shoulders 11 and 12 function as limiters of the downwards movement of the tip-removing sleeve 4'. In the exemplifying embodiment shown in FIG. 2, no spring has been fitted at all as acting upon the tip-removing sleeve 4', but the sleeve 4' rests against the upper edge of the tip vessel 1 when pipetting is performed. When the pipette is swayed in the direction of the arrow 30, the weight 5' and the tip-removing sleeve 4' move back and forth a movement up and down and hit, by the effect of the force of the weight, the tip vessel 1 off from the bottom portion of the tip tube 6. In the embodiment shown in FIG. 2, it is possible to provide a weak compression spring to push the weight 5' and the sleeve 4' either upwards or downwards, or two compression springs, by means of which the weight 5' and the sleeve 4' are kept around the middle of their movement when in rest position. The springs do, however, not change the principle of operation of the pipette tip-remover, and therefore they have not been illustrated separately in FIG. 2. On the other hand, instead of a spring or springs, in this connection it is also possible to use some other elastic means, such as rubber rings or cushions, as limiters of the movement of the tip-removing sleeve 4'.

FIG. 3 shows an embodiment alternative to the constructional embodiments shown in FIGS. 1 and 2. In this embodiment the tip-removing sleeve 4'' is fitted into position by means of a drawing spring 7, corresponding the embodiment shown in FIG. 1. However, in the case shown in FIG. 3, the tip-removing sleeve 4'' is not provided with a weight-piece, nor does the sleeve 4'' itself involve a weight-piece, but the mobile weight 5'' is mounted as separate from the sleeve 4'' onto a lever arm 13, which is mounted by means of hinges to the tubular lower end of the pipette or to the pipette body. When the pipette is appropriately swayed with the hand, the momentum of inertia of the weight 5'', by means of the lever 13 and a cam 14 placed on it and directed downwards, produces a force against the upper edge of the tip-removing sleeve 4'', whereby the tip-removing sleeve 4'' further pushes the tip vessel 1 off from its friction joint from the lower portion of the tip tube 6.

FIG. 4 shows an embodiment alternative to the constructional embodiments shown in FIGS. 1 to 3. In this embodiment the mobile weight 5''' is mounted as freely moving in a channel 15 parallel with the longitudinal axis of the pipette and placed inside the pipette body 8. At the lower end of the channel 15 there is a pusher 16 which is fastened to the sleeve 4''' placed around the tubular lower end 6 of the pipette. A screw 17, which has a hole for the pusher 16, controls the movement of the pusher 16. A spring 31 keeps the pusher 16 and the tip-removing sleeve 4''' in their upper positions. The screw 17 supports the lower end of the spring 31. When the pipette is swayed appropriately in the longitudinal direction, the weight-piece 5''' placed freely in the upper part of the channel 15 rises at the beginning of the swaying movement to the upper end of the channel 15 and, at the end of the swaying movement, hits against the upper end of the pusher 16 thereby producing a sudden shifting of the tip-removing sleeve 4''' downwards and transfer of the impact force by the intermediate of the tip-removing sleeve 4''' to the tip vessel 1, which thereby becomes detached from its friction joint. The spring 31 restores the tip-removing sleeve 4''' and the pusher 16 to the pusher position. The lock disk 18 function as the upper stop and movement limiter of the pusher 16. A spring 19 fitted at the upper end of the weight-piece 5''' softens the movement of the weight-piece 5''' at the upper end of the channel 15 and reduces the noise. Instead of a spring 19, it is possible to use a corresponding spring 20 at the upper end of the channel 15.

The embodiments of the device in accordance with the invention are by no means confined to the examples described above, but their combinations and other embodiments are numerous while the nature of the invention remains the same.

It should be noticed that the operator of a pipette provided with a tip remover in accordance with the present invention may handle the pipettings, taking of samples, and removal of the tip favourably by one hand only, but if he so desires, the operator may move the tip remover by the other hand.

What we claim is:

1. A device for removing a detachable tip of a pipette of the hand-held type having a tubular portion on which said detachable tip is press-fitted, comprising:

a sleeve slidably mounted above said tubular portion, said sleeve being displaceable from a first position out of engagement with said tip to a second position in engagement with said tip to displace and detach said tip from said tubular portion, and inertia means coupled for movement with said sleeve, said insertia means having a mass sufficient to cause said sleeve to be displaced from said first to said second position and to remove said tip upon the motion caused by the rapid movement of a user's hand, of said pipette in a direction toward said tip.

2. The device as claimed in claim 1, wherein said inertia means are integral with said sleeve.

3. The device as claimed in claim 1, wherein said inertia means are pivotally mounted to said pipette.

4. The device as claimed in claim 1, wherein said inertia means are slidably mounted to said pipette remote from said sleeve.

5. The device as claimed in claim 1, wherein said sleeve is spaced apart from said tip at said first position a distance of between 2 to 25 millimeters.

6. The device as claimed in claim 1, wherein said sleeve includes means for biasing said sleeve into said first position.

7. The device as claimed in claim 6, wherein said biasing means comprise spring means and wherein said mass of said inertia means is sufficient to overcome the bias of said spring means upon said rapid motion of said pipette.

* * * * *